3,556,802
METHOD FOR MAKING RYE FLAKES FROM EXPLODED KERNELS
Clayton O. Gulstad, Coon Rapids, Minn., assignor to General Mills, Inc., a corporation of Delaware
No Drawing. Filed Aug. 28, 1967, Ser. No. 663,502
Int. Cl. A23l 1/10, 1/18
U.S. Cl. 99—80                                    11 Claims

ABSTRACT OF THE DISCLOSURE

A new ready-to-eat flaked breakfast cereal and process for making it. Kernels of grain are explosively puffed to gelatinize the starch, and then milled into flour. The flour is mixed with water and one or more flavoring ingredients to form a dough which is formed into pellets which are flaked and toasted.

---

The present invention relates to a breakfast cereal, and to a process for making such a cereal. More specifically the invention concerns an improved process for making a ready-to-eat flaked cold cereal, which includes a starch containing cereal flour which has been at least partially gelatinized by explosively puffing the cereal grain.

As known to those skilled in the art, ready-to-eat breakfast cereals are often produced by either puffing or expanding a cooked cereal pellet to form a puffed cereal, or by forming a cooked pellet into a flattened, crispy cereal flake. In both instances, the starch containing grain out of which the cereal is formed, is usually gelatinized by preparing a moist dough which is then cooked to a uniform degree, thus gelatinizing the starch and transforming the dough into a pliable, elastic mass capable of further handling.

When making a flaked cereal, generally, the material of cereal grains is cooked either in grit or dough form at a moisture level ranging upward from about 30%, for 50–150 minutes in the presence of various flavoring ingredients. Cooking is customarily carried out by steaming the ingredients in a pressure cooker where the materials can be gelatinized under a pressure ranging from about 15–30 p.s.i.g. In certain instances, however, the grain is cooked at atmospheric pressure for a similar time period. Such long cooking times at an elevated temperature are required because the products being cooked are natural grains, parts of grains, or nonhomogeneous agglomerates of non-uniform size. After cooking, the cooked material is dried to a prescribed moisture level, and tempered for a prescribed period of time, to permit the grain or dough to be subsequently formed into flakes.

Such flaking procedures require an extensive amount of time, especially for the cooking or gelatinizing step; and they require a number of cookers if the product is to be produced on a production scale basis, thus requiring a large amount of building space and capital expenditure. Moreover, it has been found that certain cereal grains, such as rye, develop a bitter flavor when wet cooked. It has been found that flaked cereals made from rye by conventional methods are generally not acceptable.

Accordingly, one object of the present invention is to provide an improved process for making a ready-to-eat cold cereal.

Another object is to provide an improved process for forming a ready-to-eat cereal flake from a dough which includes a cereal flour in which the starch is at least partially gelatinized.

A further object is to provide a process for making a ready-to-eat flaked cereal which is relatively simple and inexpensive, and which requires a minimum amount of time to transform the whole grain into a cereal product.

A still further object is to provide a novel process for making a flaked cereal from one or more cereal grains, in which the starch is at least partially gelatinized, said gelatinization being attained in a relatively short time and in an improved manner.

Another object is to provide a process for forming a ready-to-eat flaked cereal from a homogeneous dough which includes a gelatinized rye flour as one of the ingredients.

A further object is to provide a new and improved ready-to-eat breakfast cereal flake.

Other objects and advantages of this invention will become apparent from a consideration of the following detailed description of the invention.

In general, the invention involves preparing a flour which is at least partially gelatinized, by explosively puffing a cereal grain such as rye, and thereafter milling the puffer grain to form a flour having a prescribed particle size range. The flour thus formed can be cooled, dried if desired, and stored for future use, or it can be immediately used to form a dough out of which a ready-to-eat breakfast cereal flake is formed. The dough is prepared by combining the milled flour with water and at least one flavoring ingredient, and it is then shaped into pellets or pieces which are flaked and toasted to make a final ready-to-eat product.

Although a number of specific examples are described hereinafter which illustrate some of the types of products which can be formed by practicing the present invention, the process is basically the same for each example. The apparatus used for performing each operation are commercially available items, and while a specific kind or type of apparatus might be described, it must be realized that any number of similar devices might be satisfactorily used as well.

Since the herein described breakfast food cereal is formed from a composition which includes a cereal grain, one of the first factors to be considered is what type of grain is to be used. Any number of starch containing grains can be used, including for example, rye, corn, rice, wheat, barley, oats, etc., as well as mixtures of two or more of them. As pointed out hereinbefore, rye when cooked in a pressure cooker in accordance with prior art procedures, has not resulted in a favorable product. When used in accordance with the present invention, however, rye has been successfully used to make a good flaked cereal product, whether used alone or by combining it with other cereal grains. As noted hereinafter, special emphasis is placed on the use of rye in practicing the present invention; it must be realized of course, that the invention can be effectively practiced by using other grains as well.

The cereal grain is explosively puffed in a puffing gun so that it is expanded in size from about 3–10 times its original size, and preferably about 6 times. Any type of gun puffing apparatus can be used, as the grain can be puffed in either a batch or a continuous puffing gun. Moreover, the grain can be expanded into a vacuum or into atmospheric pressure. As known to those skilled in the art, the grains are puffed by sudden release from a heated confined area into an area having a larger volume and a lower pressure; such a puffing operation causes the starch in the grain to gelatinize. The extent of starch gelatinization of course, depends on the specific processing conditions used. It has been found in the present instance, that optimum results are obtained when complete gelatinization is obtained. It should be pointed out however, that in some instances, less than complete gelatinization may be adequate, and it must be realized that the texture and quality of the product will vary to some extent, dependent upon the amount of starch damage incurred. As known to those skilled in the art, there are various methods and procedures recognized for determining the amount of starch gelatinization which has been achieved. No detailed description of such procedures will be described herein.

For purposes of illustration, U.S. Pat. 3,231,387 illustrates a puffing gun which can be used with excellent results. In such an apparatus, the feed material is continuously fed through a rotary valve into a long puffing gun and is discharged from the end of the puffing gun. In a typical operation, the grain is fed into the chamber at a feed rate which ranges from 10 to 30 pounds per minute, along with steam at about 40–130 p.s.i.g., and preferably about 100 p.s.i.g., at a temperature ranging from about 300–500° F. The barrel is maintained at a temperature of about 500–700° F. The grain is maintained in the gun for about 15–120 seconds and discharged continuously to yield a puffed or expanded product which is appreciably larger than the original grain. The starch of such a puffed product is at least partially gelatinized and in many instances, complete gelatinization can be achieved.

Where a batch gun is used, the moisture of the feed material is preferably somewhat higher than normally used in a continuous puffing operation. Batch gun conditions are in the range of the following: gun temperature 325–750° F., internal pressure 80–125 p.s.i.g., residence time 3–15 minutes.

The whole grain having a moisture content ranging from about 8–14%, is admitted into the puffing chamber where it is subjected to high heat and temperature conditions. When discharged, the kernels are expanded in size, e.g., 6 times their original volume, and their moisture content is reduced to about 3–8%. In this regard, it should be realized that the moisture level of the incoming grain might vary, depending upon the particular puffing procedure used, the particular grain being puffed, and the amount of expansion desired. Furthermore, in certain instances it might be preferred to temper or steep the grain before it is puffed. When a batch gun is used for example, it might be preferred to increase the moisture content of the grain to 15–22%.

After the grain has been puffed it is discharged from the gun at a fairly high temperature, e.g. 120–150° F.; consequently, it might be necessary or desirable to cool the product. This is particularly true if the puffed product is to be stored for a period of time before it is further processed. Any known method of cooling the product can be employed to lower the temperature to a suitable level, e.g., room temperature. If the product is to be immediately processed further, such cooling might not be necessary or desirable.

After the grain has been puffed, it is admitted into a mill where it is ground into flour. Various types of well known and commercially available reduction mills can be used with satisfactory results for milling the puffed grain. Mechanical impact mills having hammers and/or whizzers therein which impact against the particles and aid in moving them through the grinding chamber are commonly known and used for grinding purposes. Mills which might be used include Fitzpatrick Mills, Raymond Vertical Mills, Alpine Pin Mills, Schutz-O'Neill Mills, and the like. As known to those skilled in the art, such machines include a plurality of hammers and/or whizzers which are mounted within a grinding chamber in such a manner that the hammers are caused to rotate about a prescribed axis. The material to be pulverized is introduced into the chamber where the particles are accelerated to a high speed by the rotating hammers and reduced in size by attrition with the hammers and the walls of the grinding chamber. The particle size distribution of the flour is not overly critical, and its size range might vary, dependent upon the specific grain being used, the desired texture of the final food product, and the like. Generally, it has been found that best results are obtained if the particle size is less than about 350 microns. In certain instances, it might be desirable to subject the puffed grain to more than one milling operation in order to reduce the flour to the desired particle size.

Following the grinding operation, a dough is formed by combining and mixing the milled flour with water, and if desired, one or more flavoring or coloring agents. Illustrative of the type of mixer satisfactorily used is a commercial size Hobart blender, Model No. M-802. The amount of water to be added will vary, dependent upon the amount of moisture desired in the mixed dough. It has been found that for a given amount of flour, its total moisture content, including its original moisture content, should range from about 30–50% and preferably about 35% based upon total weight.

Various kinds of flavoring ingredients can be used for achieving a breakfast cereal product with a specific, distinctive flavor. Sucrose, for example, is ofttimes included in the dough formulation for improving the overall flavor of the finished product. Salt, one or more other flavoring ingredients, such as malt syrup, and one or more food colorants can also be included in the dough if desired. If the cereal product is to be formed from more than one cereal grain, the different grains are preferably mixed together after they have been milled into flour. If desired, they can be mixed together in an appropriate mixing device before they are combined with the water to form the dough; or if preferred, all the ingredients, including the water and any flavoring ingredients, might be mixed together at one time. The ingredients should be mixed long enough so that the gelatinized flour absorbs the desired moisture.

After mixing for a prescribed period of time, the dough is formed into pellets or pieces. Various types of equipment can be used for performing this operation. One procedure for example, is to force the dough through a die opening in an extruder, and then immediately cut the extrudate into segments having a predetermined length. In this regard, if preferred, the extrudate could be permitted to cool or temper for a period of time before it is sliced. Extruders of different kinds are known which will work satisfactorily; continuous screw extruders which work the dough have been used with good results; and piston type extruders have also proven satisfactory. As known, such extruders force the dough through a die opening having a prescribed size and shape, so that an extrudate is formed having substantially the same shape as the die opening. Preferably, high pressure extruders which extrude the dough under a pressure ranging from about 1200–3500 p.s.i.g. should be used because they form a pellet which is quite compact and dense. It has also been found that optimum results are obtained when the temperature of the dough and the extrudate is not too hot; therefore, it might be desirable to water cool the extruder so that the temperature of the dough and the extrudate are maintained below a prescribed temperature. Since the starch is partialy or wholly gelatinized during puffing, it is unnecessary to cook the dough during the extrusion process. Moreover, if the extrudate is immediately sliced, the dough has a tendency to stick to the cutter blade if the product temperature is too hot. It has been found that best results are obtained when the product temperature is maintained below 140° F., and preferably about 80–110° F.

Following the formation of the dough into pellets, the pellets are surface dried by appropriate means, e.g., a rotary drier, to reduce their moisture content to about 18–25%. The surface drying can be accomplished at a temperature of about 175° to 225° F. for about 2–3 minutes. The surface dried pellets are then flaked through appropriate flaking rolls having a prescribed spacing so that they are flattened to a prescribed thickness. Following the flaking step, the flattened pellets are toasted in an appropriate hot air oven at a temperature preferably ranging from about 350–450° F., for 2–4 minutes, to form the finished flaked cereal. Some expansion or blistering of the flakes occurs during the toasting step, although a uniform expansion does not generally occur.

According to the invention, it has been found that a ready-to-eat flaked cereal can be formed from a dough which includes a single flour, or it can be formed from a dough which includes two or more different flours. It has been found for example, that rye when processed according to the invention, results in a ready-to-eat flaked cereal having a distinct and different flavor, when compared to most cold cereals currently available on the market. Moreover, it has been found that a mixture of rye flour and corn flour produces a flaked cereal having a unique and different flavor and texture. The specific ranges of rye to corn in the flour mixture might range from about 15–50% rye flour to about 50–85% corn flour. A preferred amount of each flour would be about 25% rye flour and 75% corn flour. If rice flour is included in the mixture, the amount of each flour might vary from about 15–60% of each. A preferred amount of each flour would be 25% rye flour, 25% rice flour, and 50% corn flour. A number of specific examples are set forth hereinbelow which illustrate the invention in detail. It should be realized of course, that the above amounts would be somewhat less when combined with the other ingredients forming the dough, such as sucrose and water. The amount of sucrose should preferably comprise about 7–9% of the dough, and as pointed out above, the amount of moisture in the dough should range from about 30–50%.

The invention will be better understood with reference to the following examples.

EXAMPLE I

Three hundred pounds of clean, dry rye having a moisture content of about 8.3% were fed into a continuous puffng gun at a feed rate of about 10 lb./min. The following gun conditions were employed:

Steam pressure—100 p.s.i.g.
Steam temperature—385° F.
Barrel angle, below horizontal—3°
Barrel rotation—45 r.p.m.
Barrel temperature—700° F.
Puffing nozzle orifice diameter—½ inch
Barrel size (diam. x length)—10 inch dia. x 12 feet long The kernels were retained within the gun for approximately 50–60 seconds, and when discharged, they had expanded appreciably in size, they had a temperature of about 140° F., and they were substantially completely gelatinized.

The puffed rye was then milled into flour by feeding it through an Alpine Kolloplex pin mill, Model No. 160Z, twice. The mill operated at a rotor speed of about 19,000 r.p.m. A sieve size analysis of the milled product (100 gm. sample sieved 5 minutes on a Ro-Tap sifter) gave the following results:

TABLE I

| Through | Over* | Percent product |
|---|---|---|
| 0 | 60 wire (250μ) | 0.5 |
| 60 wire | 80 wire (177μ) | 15.4 |
| 80 wire | 100 wire (149μ) | 30.6 |
| 100 wire | 120 wire (125μ) | 40.6 |
| 120 wire |  | 12.9 |

*U.S. Standard Screen.

A dough was formed by combining and mixing 3880 grams of the above rye flour with 545 grams sucrose, 113 grams salt, and 1690 milliliters water, in a Hobart blender. The ingredients were mixed together for about 20 minutes to allow an adequate amount of time for the gelatinized flour to absorb the moisture. The resulting mixture had a moisture content of about 32%.

The dough was then introduced into a piston-type extruder having a die opening through which the dough was extruded at a pressure of about 2200 p.s.i.g. The extrudate was immediately cut into pellets about ⅛–⅜ inch in length. The pellets were then surface dried, by drying them in a continuous rotary drier having a temperature of about 200° F. The residence time of the pellets within the drier was about 2½–3 minutes, and their moisture content was reduced to about 23%.

The surface dried pellets were than flaked by passing them between a pair of flaking rolls which were spaced apart about 0.020 inch. After flaking, the pellets were toasted by introducing them into a hot air continuous belt oven having a temperature of about 375° F. The residence time of the flakes within the oven was about 3¼ minutes. The flakes thus produced had a moisture content of about 1%, they were very tasty, they had good texture, and an appetizing appearance.

EXAMPLE II

One hundred pounds of corn grits were fed into a continuous puffing gun at a feed rate of about 10 lb./min. The following gun conditions were employed:

Steam pressure—110 p.s.i.g.
Steam temperature—500° F.
Barrel angle, below horizontal—3°
Barrel rotation—50 r.p.m.
Barrel temperature—640° F.
Puffing nozzle orifice diameter—½ inch
Barrel size—10 inch diam. x 12 feet long The corn thus puffed, was substantially completely getatinized. After puffing, the corn was formed into flour by first milling it in a Fitz mill using a 1A screen, and then milling it in an Alpine Kolloplex pin mill operating at a rotor speed of about 19,000 r.p.m. A sieve size analysis of the milled product gave the following results:

TABLE II

| Through | Over* | Percent product |
|---|---|---|
| 0 | 60 wire (250μ) | 20.9 |
| 60 wire | 80 wire (177μ) | 18.4 |
| 80 wire | 100 wire (149μ) | 27.8 |
| 100 wire | 120 wire (125μ) | 25.9 |
| 120 wire |  | 7.0 |

*U.S. Standard Screen.

A dough formed by combining and mixing 970 grams of the rye flour produced in Example I, with 2910 grams of the above corn flour, 545 grams sucrose, 113 grams salt, and 1910 ml. water, in a blender for enough time to permit the flour to absorb the water. The resulting mixture had a moisture content of about 35%. The dough was then pelletized by extruding it through a die opening in a piston-type extruder at a pressure of about 1400 p.s.i.g., and cutting it into pellets of a prescribed length. The pellets were then surface dried at about 200° F. for 10 minutes in a rotary drier, thus reducing their moisture content to about 23%. The pellets were then flaked, and toasted at at temperature of 375° F. for about 2½ minutes. The resulting flakes were well formed, they were quite crispy, and they had an excellent flavor.

EXAMPLE III

A dough was formed which was similar to the dough formed in Example II, except that part of the corn flour was replaced by rice flour. The rice flour was prepared by feeding 300 pounds of Grade No. 1 extra fancy polished rice at a feed rate of 10 lbs./min. into a continuous puffing gun which employed the following gun conditions;

Steam pressure—110 p.s.i.g.
Steam temperature—400° F.
Barrel angle, below horizontal—3°
Barrel rotation—78 r.p.m.
Barrel temperature—560° F.
Nozzle size—½ inch
Barrel size—10 in. diam. x 12 feet long The puffed rice, which was substantially completely gelatinized was milled into flour by passing it through a Fitz mill using a 1A screen, and then passing it through an Alpine Kolloplex pin mill operating at 19,000 r.p.m. A sieve size analysis of the milled product gave the following results:

TABLE III

| Through | Over* | Percent product |
|---|---|---|
| 0 | 60 wire (250μ) | 0.5 |
| 60 wire | 80 wire (177μ) | 15.4 |
| 80 wire | 100 wire (149μ) | 30.6 |
| 100 wire | 120 wire (125μ) | 40.6 |
| 120 wire | | 12.9 |

*U.S. Standard Screen.

A dough was formed by replacing 970 grams of the corn flour used in Example II, with 970 grams of the rice flour produced above, thus reducing the amount of corn flour used to 1940 grams. The same amounts of rye our, sucrose, salt, and water were used as described above in Example II. The resulting dough was then processed in substantially the same manner as the dough formed in Example II to form flaked pellets which were then toasted at a temperature of 375° F. for about 3¼ minutes. The product thus produced flaked well, the flakes had smooth edges, their texture and grain was excellent, and the flakes had a delicious flavor.

In the above description, a disclosure of the principles of this invention is presented, together with some of the specific examples by which the invention may be carried out.

Therefore I claim:

1. A process for making a breakfast cereal product which comprises explosively puffing rye kernels thereby at least partially gelatinizing the starch contained in said rye kernels, milling the puffed kernels to form a flour having a particle size within a prescribed range, forming a dough by mixing and blending said flour with water and at least one flavoring ingredient, forming said dough into pellets, drying said pellets to a prescribed moisture level, forming said pellets into flakes, and toasting said flakes at a temperature of at least 350° F. for at least 2 minutes.

2. The process of claim 1 wherein the flour is formed from at least two cereal grains which have been explosively puffed.

3. The process of claim 2 wherein said cereal grains are rye and corn, said rye comprising about 15-50% of the flour.

4. The process of claim 2 wherein said cereal grains are rye, corn, and rice, said rye comprising at least 15% of the flour.

5. The process of claim 1 wherein said rye kernels are puffed by subjecting them to a temperature of at least 350° F. and a pressure of at least 100 p.s.i.g. for about 60 seconds.

6. The process of claim 1 wherein the puffed kernels are milled to a particle size less than 350 microns.

7. The process of claim 1 wherein the moisture content of said dough ranges from about 30-50%, and said dough includes sucrose and salt as flavoring ingredients.

8. The process of claim 1 wherein the dough is formed into pellets by extruding it through a die opening at a pressure of at least 2000 p.s.i.g. without cooking the dough, and cutting it into slices.

9. The process of claim 1 wherein the moisture content of the pellets is reduced to at least 25% during the drying step by subjecting the pellets to heated air having a temperature of about 200° F. for 2-3 minutes.

10. The process of claim 1 wherein the flakes are formed by passing the pellets between a pair of rolls, the thickness of said flakes ranging from about .008 to .025 inch.

11. The process of claim 1 wherein the flakes are toasted at a temperature of about 375° F. for 2½-3½ minutes.

References Cited

UNITED STATES PATENTS

| 766,212 | 8/1904 | Anderson | 99—82 |
| 1,933,158 | 10/1933 | Bohn et al. | 99—82 |
| 2,282,783 | 5/1942 | Musher | 99—82 |
| 2,998,317 | 8/1961 | Reesman | 99—80 |

ALVIN E. TANENHOLTZ, Primary Examiner

J. R. HOFFMAN, Assistant Examiner

U.S. Cl. X.R.

99—82